(12) United States Patent
Chun et al.

(10) Patent No.: US 8,169,917 B2
(45) Date of Patent: May 1, 2012

(54) TANDEM CONNECTION MONITORING METHOD IN MPLS NETWORK

(75) Inventors: Kyung Gyu Chun, Daejeon (KR); Soon Seok Lee, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 1187 days.

(21) Appl. No.: 11/948,945

(22) Filed: Nov. 30, 2007

(65) Prior Publication Data

US 2008/0134003 A1 Jun. 5, 2008

(30) Foreign Application Priority Data

Dec. 1, 2006 (KR) .................. 10-2006-0120335
Jul. 23, 2007 (KR) .................. 10-2007-0073531

(51) Int. Cl.
*H04L 1/00* (2006.01)
(52) U.S. Cl. ..................................................... 370/241
(58) Field of Classification Search ............... 370/236.1, 370/236.2, 241–252, 389, 395.1–399
See application file for complete search history.

(56) References Cited

U.S. PATENT DOCUMENTS

| | | | | |
|---|---|---|---|---|
| 7,283,563 B1 * | 10/2007 | Allan | ............................. | 370/469 |
| 7,296,177 B2 * | 11/2007 | Johansson et al. | ............ | 714/4.12 |
| 7,693,078 B2 * | 4/2010 | Gonda | ........................ | 370/241.1 |
| 7,903,565 B2 * | 3/2011 | Addeo et al. | ................ | 370/241.1 |
| 2006/0140132 A1 | 6/2006 | Lee et al. | | |

FOREIGN PATENT DOCUMENTS

KR   2006/0084052 A   7/2006
WO   WO-00/76100 A1   12/2000

OTHER PUBLICATIONS

Kim et al, Tandem Connection Monitoring in the MPLS Network, IEEE, 4 pages, 2007.*
ITU-T Y.1711, Operation & Maintenance mechanism for MPLS networks, 36 pages, 2004.*
ITU-T G.8112/Y.1371, Interfaces for the Transport MPLS (T-MPLS) hierarchy, 28 pages, 2006.*
ITU-T G.8121/Y.1381, Packet over Transport aspects—MPLS over Transport aspects, 60 pages, 2007.*

* cited by examiner

*Primary Examiner* — Frank Duong
(74) *Attorney, Agent, or Firm* — NSIP Law

(57) ABSTRACT

Disclosed herein are a Tandem Connection Monitoring (TCM) method in an MPLS network and a data structure of a Multi-Protocol Label Switching (MPLS) OAM packet for TCM. When data are provided to users through an LSP path comprising multiple network provider in an MPLS network, the method makes it possible to independently measure LSP performance at a user level, a service provider level, and a network provider level, detect quality degradation of ingress signals by measuring performance of a preceding network, and newly measure the performance quality at the current network regardless of the performance quality of the preceding network.

16 Claims, 10 Drawing Sheets

TANDEM CONNECTION MONITORING METHOD IN MPLS NETWORK

CROSS-REFERENCE TO RELATED APPLICATIONS

This application claims the priority of Korean Patent Application No. 10-2007-73531, filed on Jul. 23, 2007 and Korean Patent Application No. 10-2006-120335, filed on Dec. 1, 2006 in the Korean Intellectual Property Office, the disclosure of which is incorporated herein by reference.

BACKGROUND OF THE INVENTION

1. Field of the Invention

The present invention relates to Tandem Connection Monitoring (TCM) technology in a Multi-Protocol Label Switching (MPLS) network, and more particularly, to a TCM method for detecting the exact location of an area where an error has occurred by newly measuring performance quality of a network, regardless of the performance quality measured in a preceding network to make clear what is responsible for the error when performance of a Label Switched Path (LSP) is degraded or an error occurs.

This work was supported by the IT R&D program of MIC/IITA[2006-S-064-01, "BcN Network Engineering"].

2. Description of the Related Art

Tandem Connection Monitoring (TCM) is a technology that has been applied to Optical Transport Hierarchy (OTH) apparatuses. The technology can perform quality monitoring at a user level, a service provider level, and a network provider level. Totally, there are six levels of TCM. TCM1 is used by users, and TCM2 is used by a service provider, while the remaining TCM3 to TCM6 are used by a network provider.

An OTH apparatus includes an optical domain and a digital domain. The digital domain adopts a TCM function. The digital domain is composed of an Optical Channel Transport Unit (OTU), an Optical Channel Data Unit (ODU), and an Optical Channel Payload Unit (OPU). TCM information is carried in an overhead of the ODU and it is formed of a total of 18 bytes, three bytes per TCM. The OTH apparatus independently stores a Trail Termination Source Identifier (TTSI) value for a section to be monitored in a TCM, and monitors desired sections at a user level, a service provider level, and a network provider level, respectively.

Meanwhile, the performance of TCM is measured by checking parity errors. A transmitter calculates parities for payload of an ODU, which is OPU, based on Byte Interleaved Parity 8 (BIP-8), and transmits the result carried in a corresponding TCM byte of the next frame. In the mean time, a TCM receiver measures performance by calculating parities for the received OPU, and comparing the value transmitted carried in the next frame with the BIP-8 value stored in the transmitter. The performance in a desired section is monitored independently on the part of the network provider, the service provider, and the users in the above-described method.

SUMMARY OF THE INVENTION

When a service provider provides a Label Switched Path (LSP) to users through a plurality of network providers in a packet network, e.g., a Multi-Protocol Label Switching (MPLS) network, and an error occurs in a specific network, it has been difficult for users and the service provider to find out exactly where performance degradation has occurred.

Since conventional MPLS technology can hardly detect where performance degradation has occurred when the performance degradation has occurred in a specific network or on the part of users, it is required to develop a method that can easily detect performance degradation and accurately detecting the location of a network that has provided a cause for the performance degradation.

To resolve the above problem, it is required to develop a means for exactly detecting the location of performance degradation as well as monitoring performance at the levels of users, a service provider, and a network provider by using a frame format such as Continuity Verification (CV) or Fast Failure Detection (FFD) among MPLS Operation and Maintenance (OAM) packets recommended by ITU-T Y.1711, when performance is degraded in the MPLS LSP.

According to an aspect of the present invention, there is provided a method for performing TCM by using a MPLS Operation and Maintenance (OAM) packet in an MPLS network. In the method, a BIP-16 parity of a received TCM packet is calculated. Then, it is determined whether there is an error by comparing the calculated BIP-16 parity with a BIP-16 parity stored in the received TCM packet. A value of '0' or '1' in an incoming error field allocated to a service provider level is set based on a determination result on the presence of an error. Then, a BIP-8 parity of the received TCM packet is calculated and the calculated BIP-8 parity is stored in a service provider TCM BIP-8 field of the received TCM packet. When the calculated BIP-8 parity is stored in a service provider TCM BIP-8 field of the received TCM packet, the TCM parity is transmitted from the service provider level.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

In order to clearly describe the present invention, the descriptions of well-known functions and elements are omitted. Like numeral references denote like element throughout the accompanying drawings.

It will be understood that when an element is referred to as being "connected" to the other element, it can be directly connected to the other element or it can be electrically connected with an element interleaved therebetween. Also, it will be understood that when an element is referred to as "including" the other elements, it can further include other elements.

Throughout the specification, a module denotes a unit of a predetermined function or processing a predetermined operation. The module can be embodied as hardware, software, or combination thereof.

Figure 1:
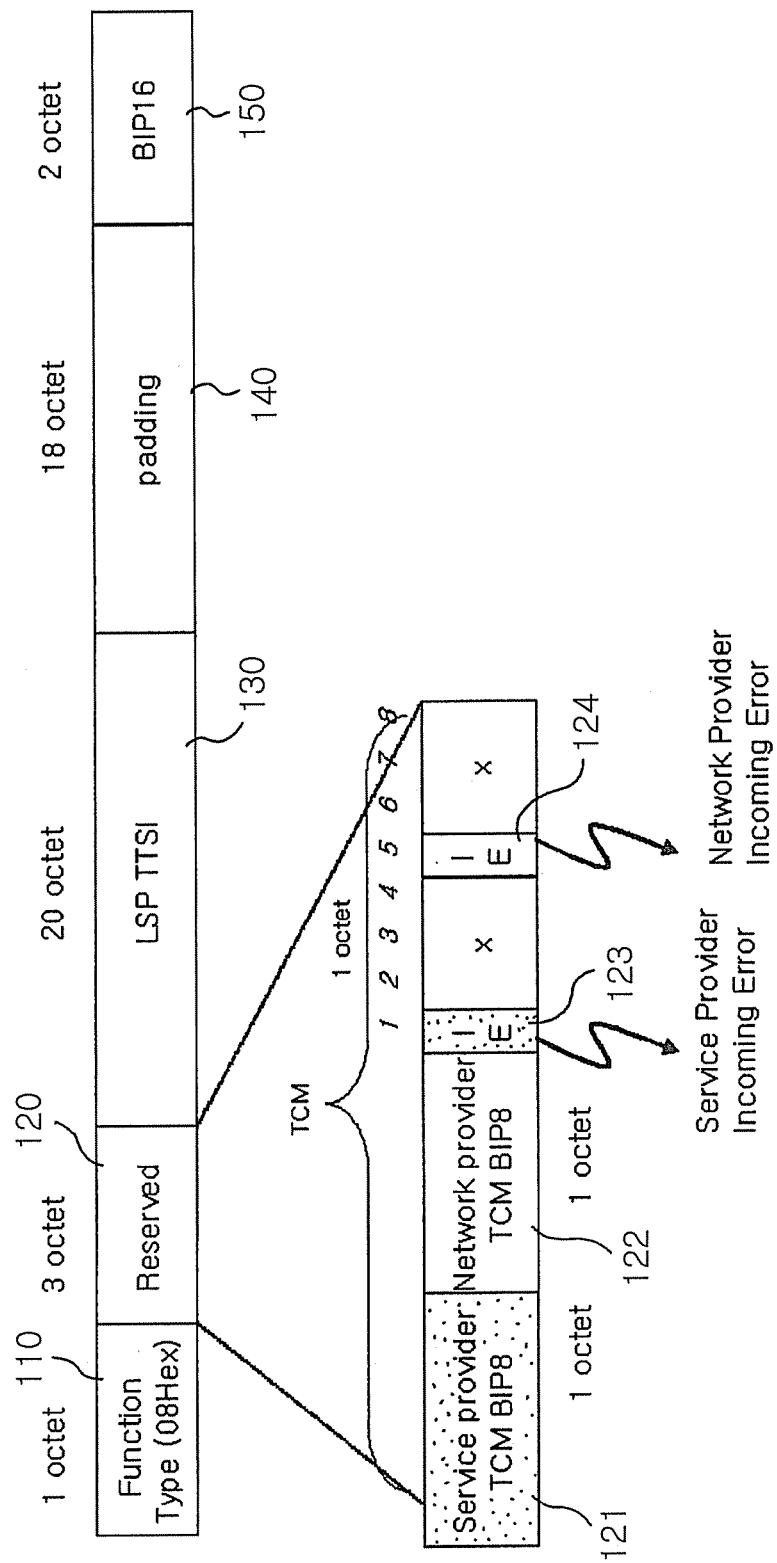
FIG. 1 illustrates a Multi-Protocol Label Switching (MPLS) Tandem Connection Monitoring (TCM) packet using 'Reserved' bytes of an ITU-T Y.1711 MPLS OAM packet in accordance with an embodiment of the present invention.

FIG. 1 illustrates a Multi-Protocol Label Switching (MPLS) Tandem Connection Monitoring (TCM) packet using 'Reserved' bytes of an ITU-T Y.1711 MPLS OAM packet in accordance with an embodiment of the present invention.

Referring to FIG. 1, a Continuity Verification (CV) packet among Multi-Protocol Label Switching (MPLS) Operation and Maintenance (OAM) packets utilizes reserved three bytes as bytes for Tandem Connection Monitoring (TCM). Hereinafter, a frame structure of an MPLS OAM packet for TCM will be described specifically.

In the CV packet among MPLS OAM packets, a function type code point field 110 comprises one byte to indicate performance capability of the packet. ITU-T Y.1711 currently defines and uses 00 to 07Hex values. In the present invention, a 08Hex value is additionally defined and used to indicate performance capability for TCM.

To utilize the "Reserved" three bytes 120 for TCM capability, one byte 121 is used for checking the Byte Interleaved Parity 8 (BIP-8) value of a service provider, and another one byte 122 is used for checking the BIP-8 value of a network provider. The other one byte is used to indicate presence of an incoming error (IE) for the checks, one bit 123 or 124 for each incoming error check.

The remaining 40 bytes of the CV packet utilize what is recommended by the Y.1711 without any change.

Figure 2:
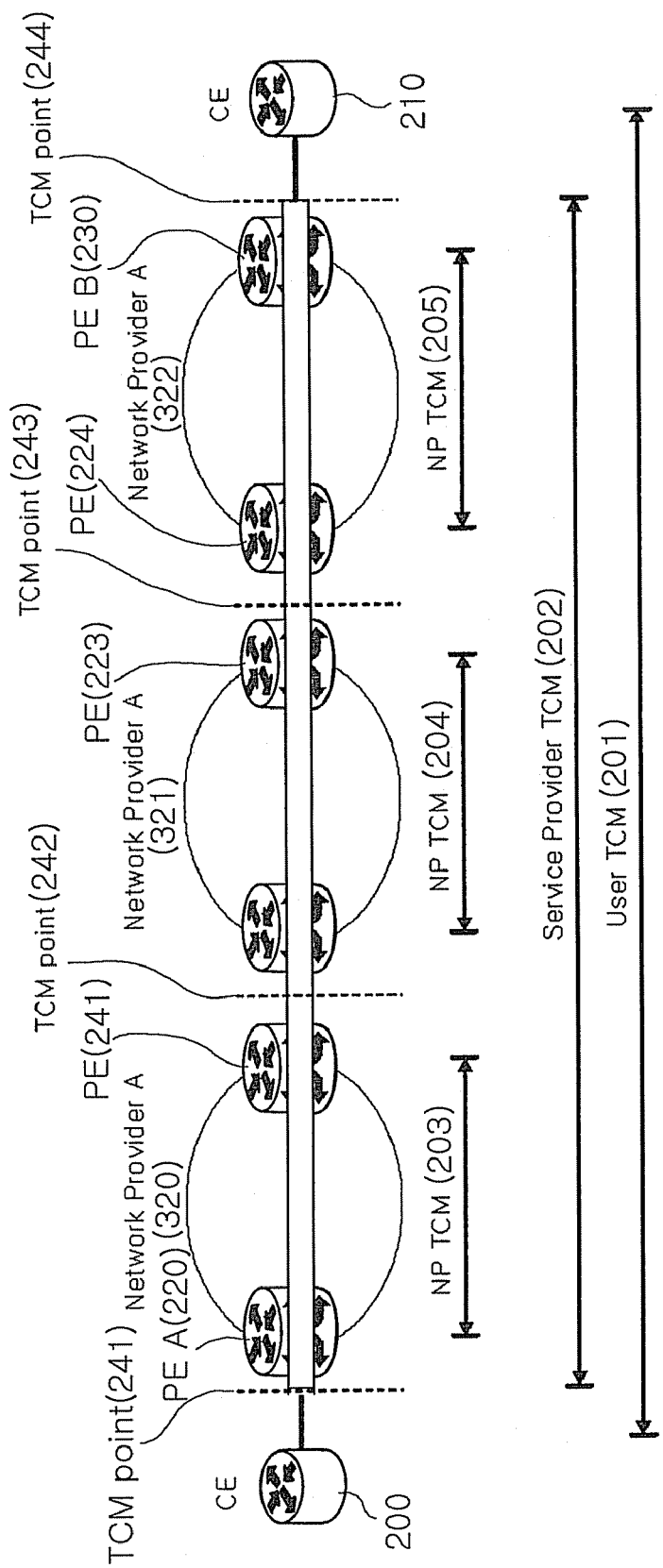
FIG. 2 illustrates a TCM section for an MPLS Label Switched Path (LSP) at a user level, a service provider level, and a network provider level in accordance with an embodiment of the present invention.

FIG. 2 illustrates a TCM section for an MPLS Label Switched Path (LSP) at a user level, a service provider level, and a network provider level in accordance with an embodiment of the present invention.

FIG. 2 shows TCM sections for each level. A user TCM 201 is defined between customer equipments (CE) 200 and 210 to perform monitoring in a user section. A service provider TCM 202 is defined between provider equipments (PE) 220 and 230. A network provider (NP) TCM A 203, an NP TCM B 204, and an NP TCM C 205 are defined between provider equipments 220 and 221, between provider equipments 222 and 223, and between provider equipments 224 and 230, respectively, to monitor presence of an error and performance of each network provider and figure out in which network an error and performance degradation have occurred.

The TCM is executed at a TCM point 241 between the customer equipment 200 and the provider equipment 220 and at a TCM point 244 between the provider equipment 230 and the customer 210, which are between a subscriber device and a network provider device. Also, TCM for each network provider is executed between the networks, which is at TCM points 242 and 243.

Figure 3:
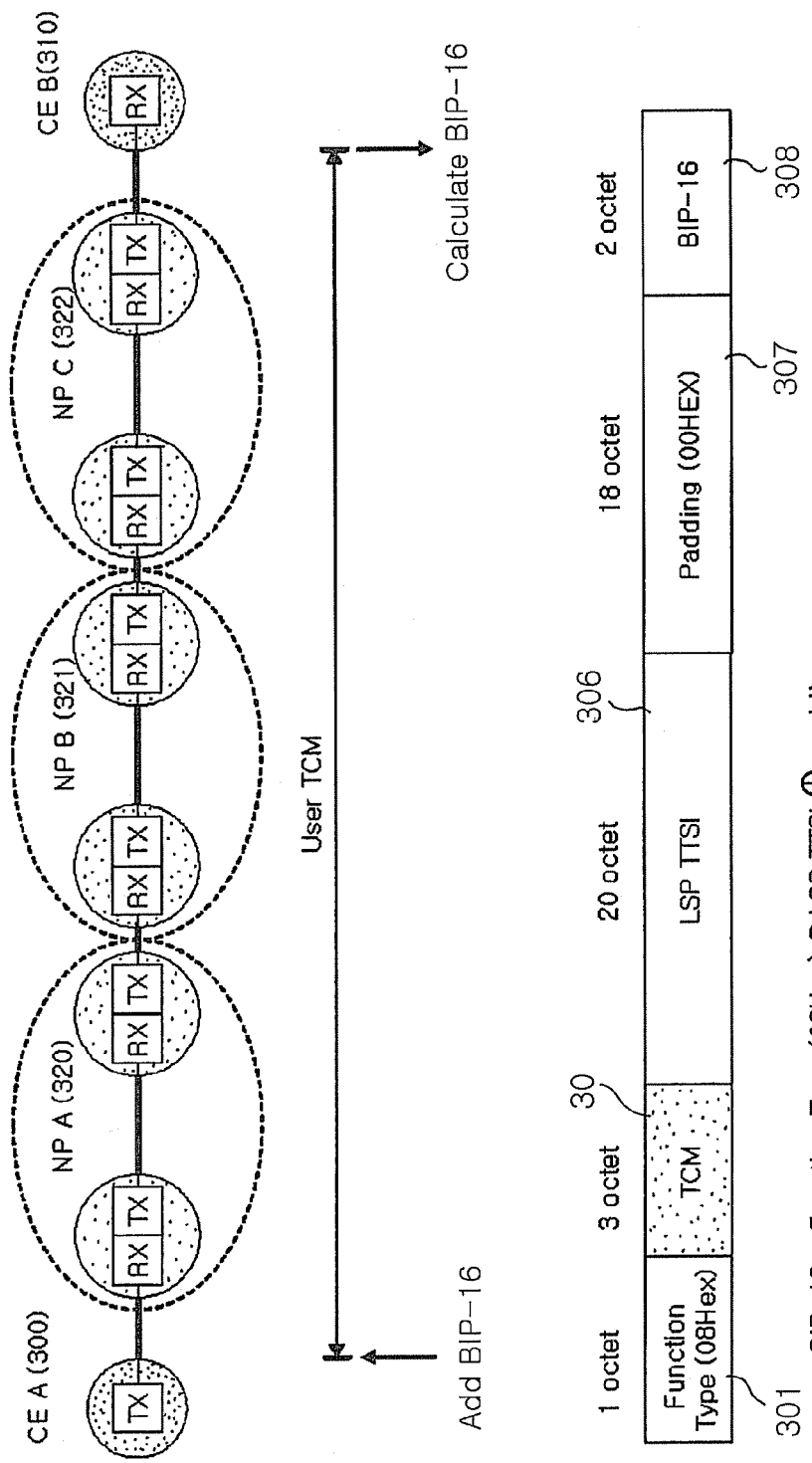
FIG. 3 illustrates a structure for TCM operation at a user level in accordance with an embodiment of the present invention.

FIG. 3 illustrates a structure for TCM operation at a user level in accordance with an embodiment of the present invention.

Referring to FIG. 3, packets are created in the structure of MPLS TCM packets specifically defined as shown in FIG. 1 to perform TCM in the MPLS LSP user level. In the structure of MPLS TCM payload, a 08Hex value is newly defined to indicate that an MPLS OAM packet includes a TCM capability and stored in a function type field 301. A Label Switched Path (LSP) Trail Termination Source Identifier (TTSI) 306 stores an address for a customer equipment (CE) A 300. Herein, the address system follows ITU-T Y.1711. A BIP-16 308 stores a result obtained by performing the following calculation onto the other bytes except the three octets allocated for TCM.

BIP-16=Function type(08Hex)(301)⊕LSP TTSI(306) ⊕padding(307)

To perform TCM at the user level using the above formed MPLS TCM packets, a TCM frame is added to the customer equipment A 300 and extracted in a customer equipment 310 and received. A byte parity for the received frame is calculated and compared with a BIP-16 transmitted from the customer equipment A 300 of the transmitter to acquire a difference.

As a result, when no error or performance degradation is detected in a network of a network provider A 320, a network of a network provider B 321, and a network of a network provider C 322, the BIP-16 value calculated in the customer equipment B 310 and the BIP-16 value transmitted by being carried on a TCM frame are the same. However, when there is an error or performance degradation in the network of the network provider A 320, the network of the network provider B 321, and the network of the network provider C 322, the two values are different from each other. Eventually, it is possible to detect the presence of an error and performance degradation in the network of the network provider A 320, the network of the network provider B 321, and the network of the network provider C 322 at the user level, too.

Figure 4:
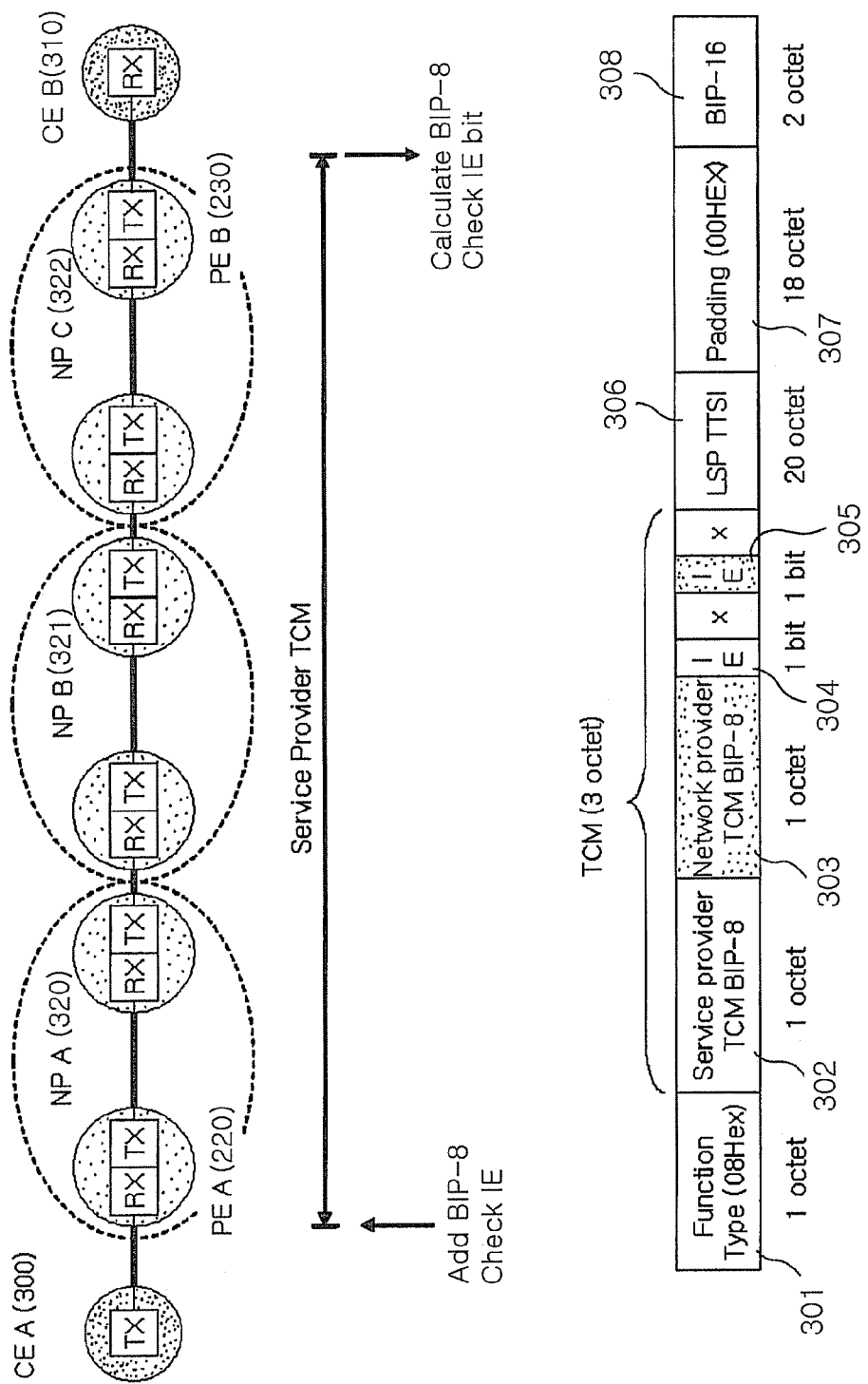
FIG. 4 illustrates a structure for TCM operation at a service provider level in accordance with an embodiment of the present invention.

FIG. 4 illustrates a structure for TCM operation at a service provider level in accordance with an embodiment of the present invention.

The service provider leases a network from a network provider and provides an MPLS LSP to subscribers. TCM at the service provider level, which is service provider TCM, is carried out between a provider equipment A 220 and a provider equipment B 230, which is a service provider section.

The provider equipment A 220 stores a BIP-8 value 302 allocated to the service provider TCM within a TCM packet frame transmitted from the customer equipment A 300 and information needed for incoming error 304. The provider equipment B 230 checks the BIP-8 value stored in the provider equipment A 220 and an incoming error bit to monitor performance in the service provider section. Herein, as shown in FIG. 1, one octet is allocated to the BIP-8 302 for the service provider TCM, and one bit is allocated to the incoming error 304.

The service provider TCM is executed in the provider equipment A 220. To be specific, the provider equipment A 220 checks the TCM packet received from the customer equipment A 300 to see if there is an error. Herein, the error detection is executed in the same method as the TCM operation method at the user level, which is described with reference to FIG. 2.

First, a BIP-16 value of a received packet is calculated based on the following equation.

BIP-16=Function type(08Hex)(301)⊕LSP TTSI(306) ⊕padding(307)

When the BIP-16 value of the received packet comes out, it is compared with a BIP-16 value 308 stored in the received packet, and it is determined whether the two values are the same.

When the two values are the same, it is determined that no error has occurred and '0' is stored in the incoming error bit 304 reserved for the service provider. When the two values are not the same, it is determined that an error has occurred and '1' is stored in the incoming error bit 304. When the occurrence of an error is determined based on the BIP-16 value and either '0' or '1' is stored in the incoming error bit 304, a BIP-8 value is calculated. The acquired BIP-8 value is stored in a packet to see if an error occurs in the service provider TCM 202.

The BIP-8 value is calculated based on the following equation, and it is stored in a service provider TCM BIP-8 302.

BIP-8=Function type(08Hex)(301)⊕LSP TTSI(306) ⊕padding(307)⊕BIP-16(308)

After the service provider TCM BIP-8 302 stores the value, the packet is transmitted.

Meanwhile, the provider equipment B 230 receives the TCM packet transmitted through the network provided by the network provider. When the TCM packet is received, the incoming error bit 304 allocated to the service provider is checked. When the value stored in the incoming error bit 304 is '1', it is determined that an error has occurred before the packet is received by the service provider.

When the value stored in the incoming error bit 304 is '0', it is determined that no error has occurred before the packet is received by the current service provider.

After the decision for the incoming error bit is made, a BIP-8 value for the received TCM packet is calculated based on the following equation.

BIP-8=Function type(08Hex)(301)⊕LSP TTSI(306) ⊕padding(307)⊕BIP-16(308)

The acquired value is compared with the value stored in the service provider TCM BIP-8 302 of the received TCM packet.

When the two BIP-8 values are the same, there are two cases. First, when the incoming error value 304 is '0', it means that packets without an error are received from the customer equipment A 300 and transmitted without an error in the service provider section. When the incoming error value 304 is '1', it means that an error is detected in the packets received from the customer equipment A 300 but the packets are transmitted without an error in the service provider section.

When the two BIP-8 values are not the same, it means that there is an error occurring while the TCM packets are transmitted. Therefore, it can be presumed that performance is degraded in the network provider section. In the same method, performance in the service provider section can be monitored.

Figure 5:
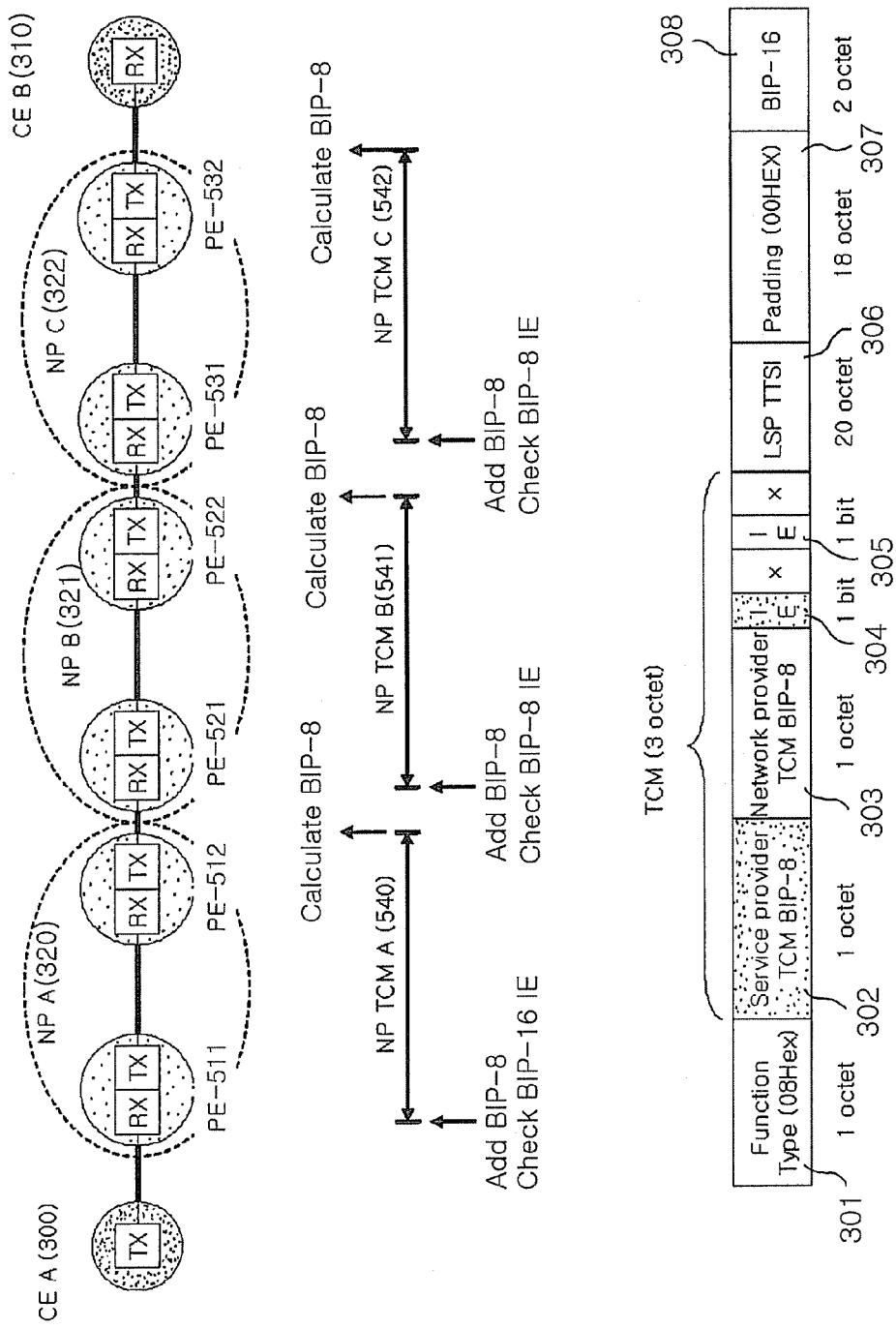
FIG. 5 illustrates a structure for TCM operation at a network provider level in accordance with an embodiment of the present invention.

FIG. 5 illustrates a structure for TCM operation at a network provider level in accordance with an embodiment of the present invention.

To execute the TCM in the network provider section, one octet of a network provider TCM BIP-8 303 is used among three octets allocated for the TCM in a TCM packet, and one bit is used to set up an incoming error bit 305, just as in the service provider TCM operation.

The network provider A 320 checks the received TCM packet transmitted from the customer equipment A 300 by using a BIP-16 value to see if there is an error. When there is an error detected in the received packet, the incoming error bit 305 for the network provider is set to '1'. When no error is detected, the incoming error bit is set to '0' and stored, and a BIP-8 value is calculated based on the following equation, just as in the TCM at the service provider. The BIP-8 value is stored in the network provider TCM BIP-8 303 in the TCM packet.

BIP-8=Function type(08Hex)⊕LSP TTSI⊕padding⊕BIP-16

Also, a provider equipment 512 receiving a TCM packet transmitted through a network calculates a BIP-8 value for the received TCM packet and compares the acquired BIP-8 value with the BIP-8 value of a BIP-8 308 of a TCM packet transmitted from a provider equipment 511.

When the two values are the same, it is determined that there is no performance degradation or an error in the section of the network provider A 320 and the packet is transmitted to another network provider B 321 that is adjacent to the network provider A 320. However, when an error is detected or the incoming error bit is set to '1', it is reported to a network management device operated by the network provider that an error has occurred in the network provider 320 or an error signal is inputted from a customer equipment.

Meanwhile, another network provider B 321 checks the parities of a TCM packet received from the network provider A 320 to measure performance in the section of a network provider TCM B 541. In short, a BIP-8 value is calculated for the inputted TCM packet and it is compared with the BIP-8 value carried on the TCM packet. Then, it is checked whether there is an incoming error. When it turns out that there is an error, the incoming error bit for the network provider is set to '1'. Subsequently, the BIP-8 value is re-calculated, stored and transmitted to a provider equipment 522. When there is no error, the incoming error bit is set to '0' and stored, and the calculated BIP-8 value remains unchanged.

In the network B 321, a receiver of the provider equipment 522 calculates a BIP-8 value for the TCM packet transmitted from a provider equipment 521 and compares the calculated BIP-8 value with a BIP-8 value stored in the packet. When the two values are the same, it is regarded that no error has occurred in the section of a network provider TCM B 541. When an incoming error bit is '1', it is determined that an error has occurred in the network of the network provider A 520 or in a network before the network of the network provider A 520.

However, when the two BIP-8 values are not the same, it is determined that an error has occurred in the section of the network provider TCM B 541.

As described above, it is possible to detect a BIP-8 error occurring in each section by independently executing TCM function for each network provider, and it is also possible for the network providers to know whether the error has occurred in their own network or an erroneous signal is inputted by using the incoming error bit.

Figure 6:
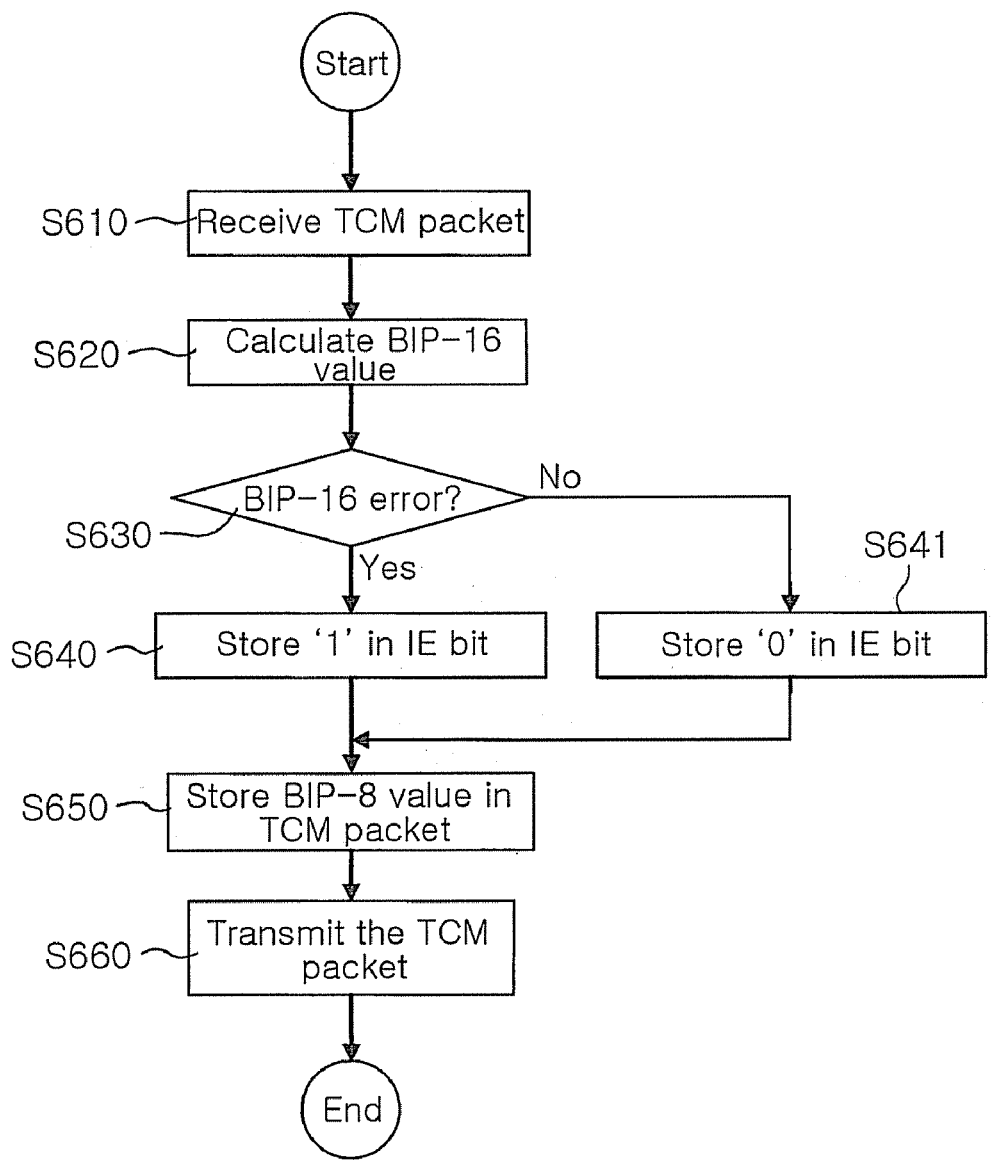
FIG. 6 is a flowchart describing an ingress signal processing flow for TCM operation at a service provider level in accordance with an embodiment of the present invention.

FIG. 6 is a flowchart describing an ingress signal processing flow for TCM operation at a service provider level in accordance with an embodiment of the present invention. FIG. 6 shows how a packet is processed in a provider equipment 511.

In operation S610, TCM at the service provider level begins with receiving a TCM packet from a customer equipment.

When the TCM packet is received, in operation S620, a BIP-16 value of the received TCM packet is calculated. The BIP-16 value is calculated as the following equation.

$$\text{BIP-16} = \text{Function type(08Hex)(301)} \oplus \text{LSP TTSI(306)} \oplus \text{padding(307)}$$

When the BIP-16 value of the received TCM packet is calculated, in operation S630, a BIP-16 value stored in the received TCM packet is compared with the calculated BIP-16 value to check if there is an error by checking whether the two BIP-16 values are the same.

When the two values are the same, it is regarded that no error has occurred and a '0' value is stored in an incoming error bit 304 allocated to the service provider in operation S641.

When the two values are different from each other, it is regarded that an error has occurred and a '1' value is stored in the incoming error bit 304 in operation S640.

When the presence of an error is determined based on the BIP-16 values and either '0' or '1' is stored in the incoming error bit 304, a BIP-8 value is calculated. The BIP-8 value is stored in the packet to check whether an error occurs in a service provider TCM 202.

The BIP-8 value is calculated based on the following equation, and it is stored in the service provider TCM BIP-8 302 of the packet in operation S650.

$$\text{BIP-8} = \text{Function type(08Hex)(301)} \oplus \text{LSP TTSI(306)} \oplus \text{padding(307)} \oplus \text{BIP-16(308)}$$

When the calculated value is stored in the service provider TCM BIP-8 302 of the TCM packet, the TCM packet is transmitted in operation S660.

Figure 7:
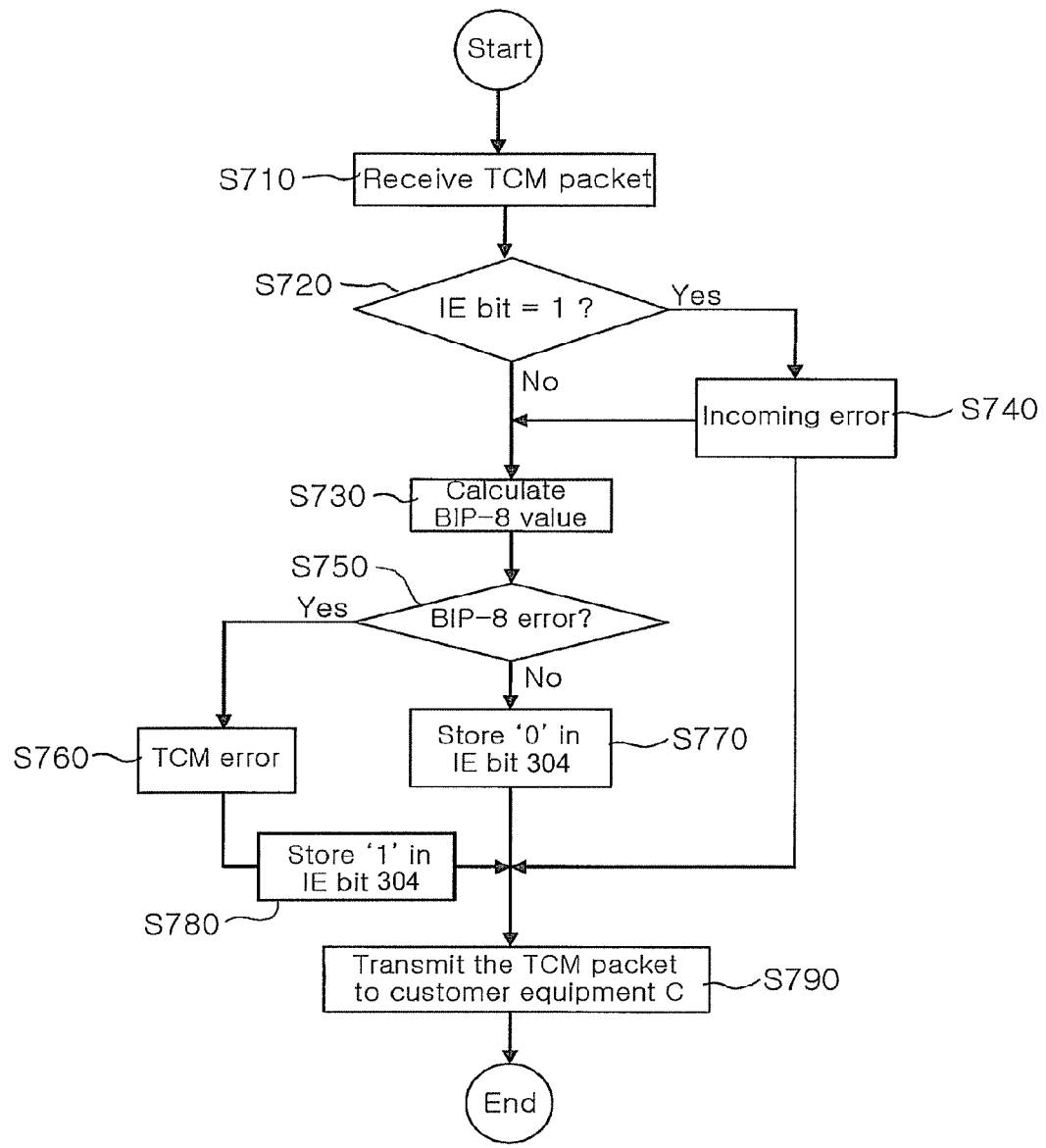
FIG. 7 is a flowchart describing an egress signal processing flow for TCM operation at a service provider level in accordance with an embodiment of the present invention.

FIG. 7 is a flowchart describing an egress signal processing flow for TCM operation at a service provider level in accordance with an embodiment of the present invention. FIG. 6 shows how a packet is processed in the provider equipment 532. Herein, TCM operation at the service provider level is described, and TCM operation at the network provider level will be described with reference to FIG. 9.

In operation S710, the provider equipment 532 receives a TCM packet transmitted through a network of the network provider.

When the TCM packet is received, in operation S720, an incoming error bit 304 allocated to a service provider is checked.

When the value stored in the incoming error bit 304 is '1', it is determined in operation S740 that an error has occurred in the section of another service provider or a customer equipment before the current service provider.

When the value stored in the incoming error bit 304 is '0', it is determined that there is no error before the current service provider.

After the decision on the incoming error bit is made, a BIP-8 value for the received TCM packet is calculated based on the following equation.

$$\text{BIP-8} = \text{Function type(08Hex)(301)} \oplus \text{LSP TTSI(306)} \oplus \text{padding(307)} \oplus \text{BIP-16(308)}$$

In operation S750, the calculated BIP-8 value is compared with a value stored in the service provider TCM BIP-8 302 of the received TCM packet.

When the calculated BIP-8 value is the same as the BIP-8 value stored in the service provider TCM BIP-8 302 of the received TCM packet, it signifies two cases.

First, when the incoming error bit 304 is '0', it means that a packet without an error is received from the customer equipment A 300 and delivered to the section of a service provider without an error. When the incoming error bit 304 is '1', it means that a packet with an error is received from the customer equipment A 300 but it is delivered to the section of a service provider without an error.

When no error occurs in the service provider section, the incoming error bit 304 of the service provider is set to '0' in operation S770.

When the two BIP-8 values are not the same, it means that an error has occurred in the middle of the TCM packet transmission. Thus, it can be presumed that performance is degraded in the network provider section. When an error occurs in the service provider section, the incoming error bit 304 of the service provider is set to '1' in operation S780.

In operation S790, the TCM packet is transmitted to a customer equipment B 310.

The performance in the service provider section can be monitored in the above described method.

Figure 8:
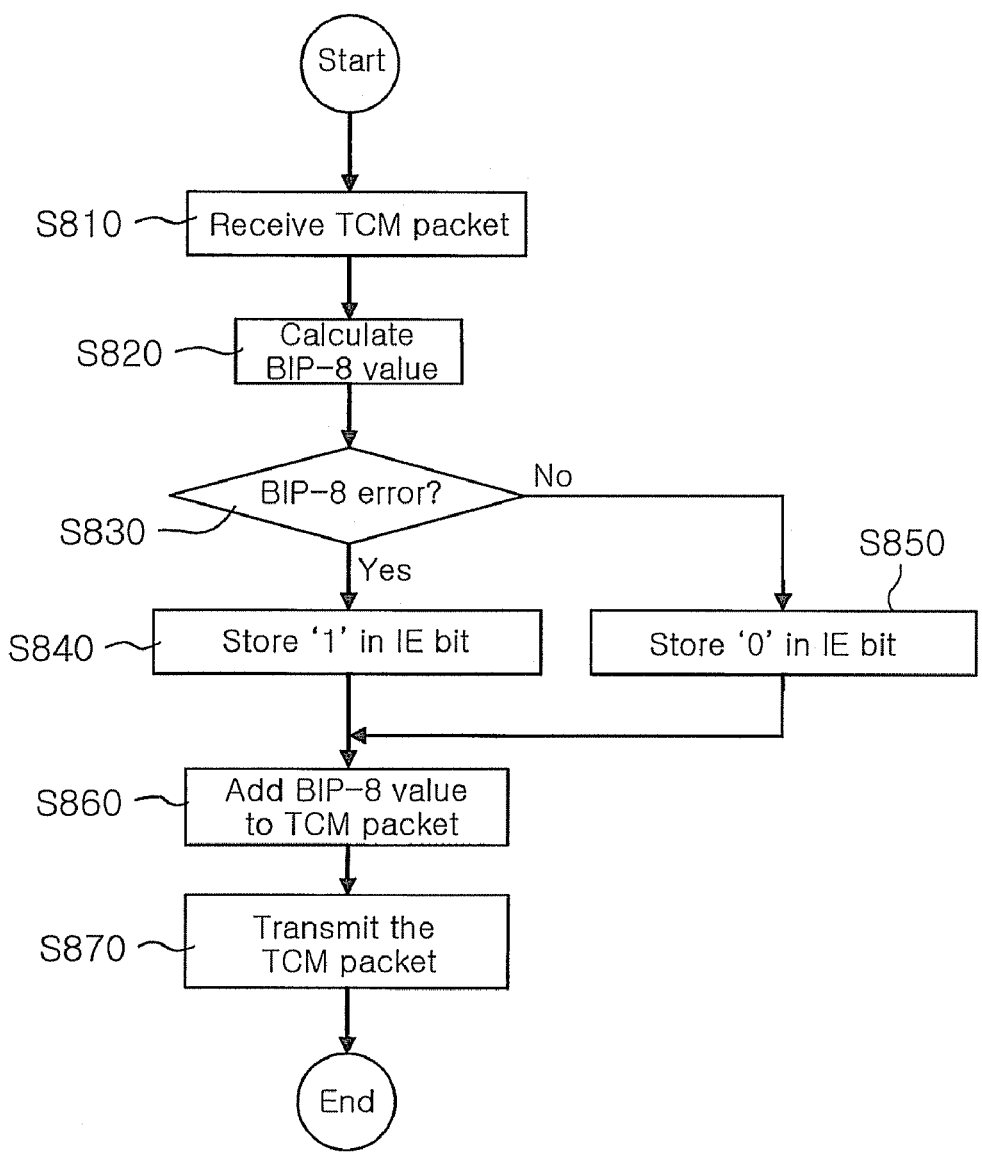
FIG. 8 is a flowchart describing an ingress signal processing flow for TCM operation at a network provider level in accordance with an embodiment of the present invention.

FIG. 8 is a flowchart describing an ingress signal processing flow for TCM operation at a network provider level in accordance with an embodiment of the present invention. FIG. 8 shows how a TCM packet is processed in the provider equipments 511, 521, and 531.

In operation S810, TCM at the network provider level beings with receiving a TCM packet from a preceding customer equipment or another network provider.

When the TCM packet is received, in operation S820, a BIP-8 value for the received TCM packet is calculated based on the following equation.

$$\text{BIP-8} = \text{Function type(08Hex)(301)} \oplus \text{LSP TTSI(306)} \oplus \text{padding(307)} \oplus \text{BIP-16(308)}$$

In operation S830, the calculated BIP-8 value is compared with a BIP-8 value stored in the network provider TCM BIP-8 303 of the received TCM packet and it is determined whether an error has occurred or not by checking if the two values are the same or not.

When the two BIP-8 values are the same, it is regarded that no error has occurred and a '0' value is stored in an incoming error bit 305 allocated to the network provider in operation S850.

When the two BIP-8 values are not the same, it means that an error has occurred. In this case, a '1' value is stored in the incoming error bit 305 in operation S840.

When no error occurs and the '0' value is stored in the incoming error bit 305, the network provider BIP-8 303 is maintained. When an error occurs and the '1' value is stored in the incoming error bit 305, the newly calculated BIP-8 value is added to the network provider BIP-8 303 in operation S860.

When the value for the network provider BIP-8 303 is determined, the TCM packet is transmitted to the network in operation S870.

Figure 9:
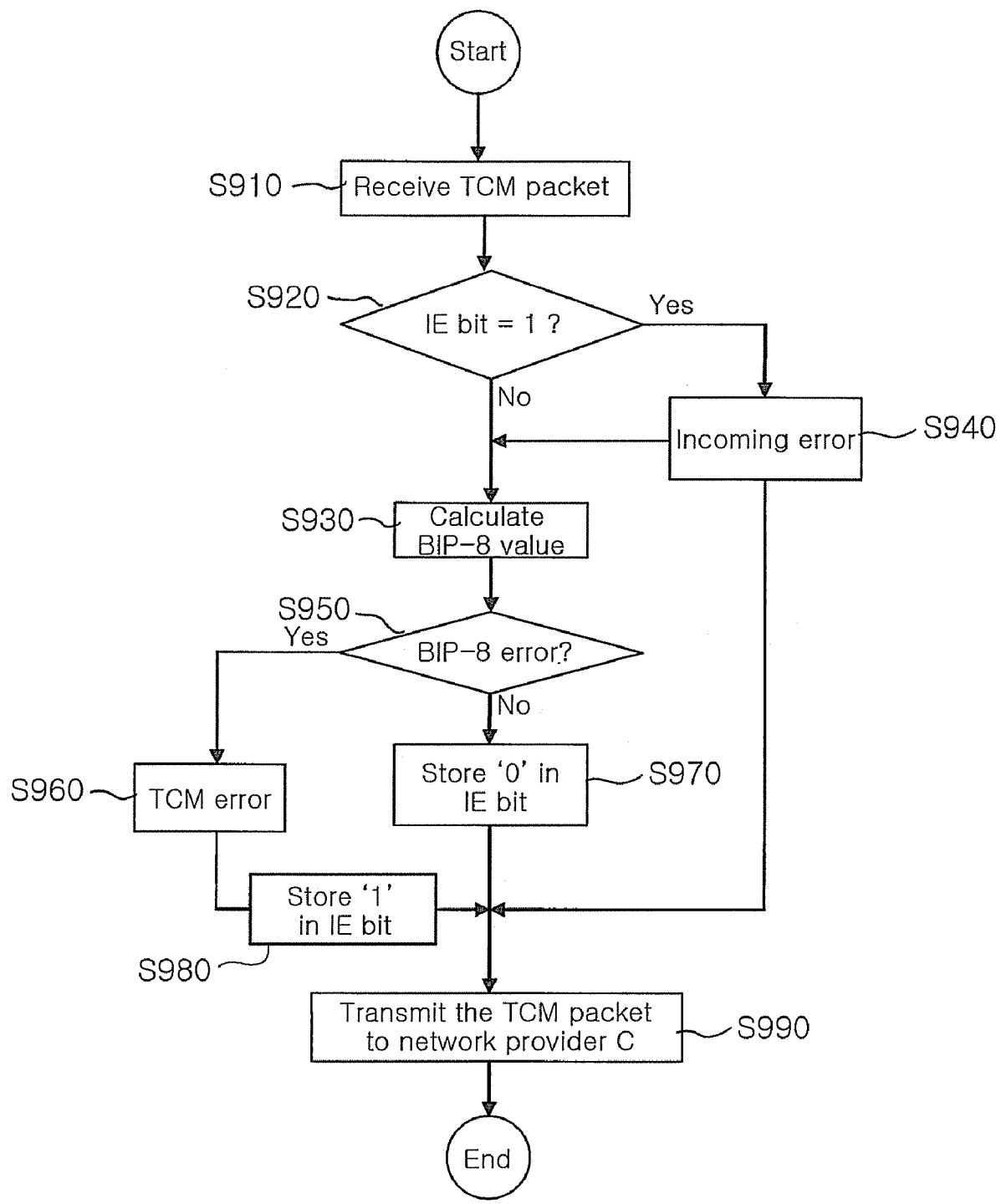
FIG. 9 is a flowchart describing an egress signal processing flow for TCM operation at a network provider level in accordance with an embodiment of the present invention.

FIG. 9 is a flowchart describing an egress signal processing flow for TCM operation at a network provider level in accordance with an embodiment of the present invention. FIG. 9 shows how a TCM packet is processed in the provider equipment 512, 522 and 532. The flow of FIG. 9 may seem similar to that of FIG. 7, but the operation of FIG. 9 is performed at the network provider level, whereas that of FIG. 7 is performed at the service provider level.

In operation S910, the provider equipments 512, 522 and 532 receive a TCM packet transmitted through networks of the network providers.

When the TCM packet is received, in operation S920, an incoming error bit 305 allocated to a network provider is checked.

When the value stored in the incoming error bit 305 is '1', it is determined in operation S940 that an error has occurred in the section of a network provider before the current network provider.

When the value stored in the incoming error bit 305 is '0', it is determined that there is no error before the current network provider. Since there is no network provider section prior to the provider equipment 512, no decision is made for the case.

After the decision on the incoming error bit 305 is made, a BIP-8 value for the received TCM packet is calculated based on the following equation.

$$\text{BIP-8} = \text{Function type}(08\text{Hex})(301) \oplus \text{LSP TTSI}(306) \oplus \text{padding}(307) \oplus \text{BIP-16}(308)$$

In operation S950, the calculated BIP-8 value is compared with a value stored in the network provider TCM BIP-8 303 of the received TCM packet.

When the calculated BIP-8 value is the same as the BIP-8 value stored in the network provider TCM BIP-8 303 of the received TCM packet, it signifies two cases.

First, when the incoming error bit 305 is '0', it means that a packet without an error is transmitted from the preceding network provider section. When the incoming error bit 305 is '1', it means that a packet with an error is transmitted from the preceding network provider section but it is received in the current network provider section without an error.

When no error occurs in the current network provider section, the incoming error bit 305 of the network provider is set to '0' in operation S970.

When the two BIP-8 values are not the same, it means that an error has occurred in the middle of the TCM packet transmission. Thus, it can be presumed that performance is degraded in the current network provider section. When an error occurs in the network provider section, the incoming error bit 305 of the network provider is set to '1' in operation S980.

In operation S990, the TCM packet is transmitted to the next network provider section or a customer equipment B 310.

The performance in the network provider section can be monitored in the above described method.

Figure 10:
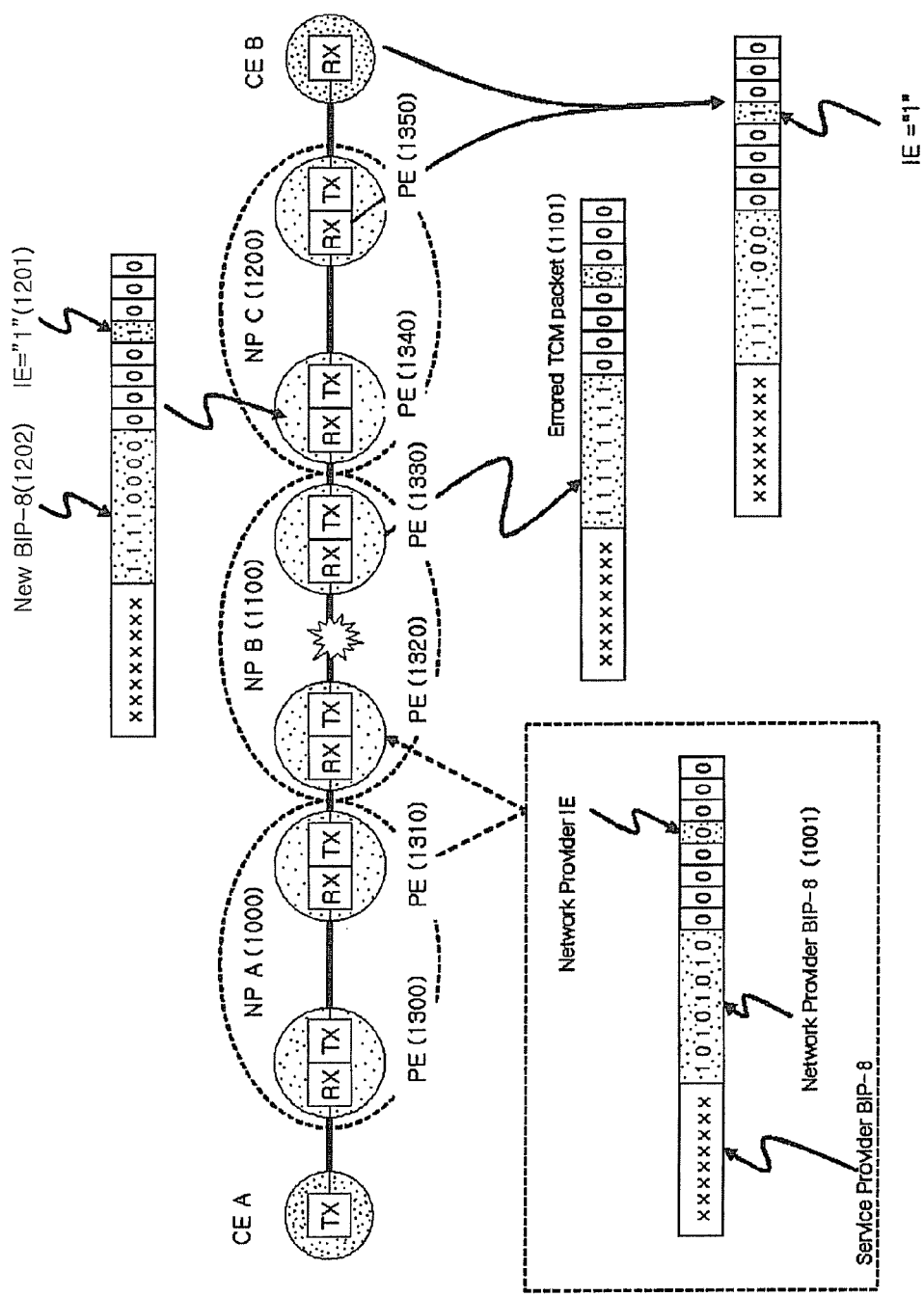
FIG. 10 illustrates a TCM packet processing method in a network provider section in accordance with an embodiment of the present invention, when an error occurs.

FIG. 10 illustrates a TCM packet processing method in a network provider section in accordance with an embodiment of the present invention, when an error occurs.

FIG. 10 exemplarily shows how TCM is operated when an error occurs in any one of network providers, specifically, when an error occurs in the network provider B 1100. In the present embodiment, it is assumed that a TCM packet inputted from a customer equipment A does not have any error in the section of a network provider A 1000.

Since no error has occurred in the network provider A 1000, it is assumed that a calculated BIP-8 value is '10101010', just as the network provider BIP-8 1001 is. Since there is no incoming error, a '0' value is stored in the network provider incoming error bit and inputted to the network provider B 1100. Since an error occurs in the network provider B 1100, the original TCM packet is not received or another form of a packet different from the original packet, i.e., an errored TCM packet 1101, is received. Herein, the network provider B 1100 knows that an error has occurred in its network and the packet with the error is transmitted to the next network provider, which is a network provider C 1200. In the network provider C 1200, since the ingress signal has an error therein, a '1' value is stored in the incoming error bit 1201, and a newly calculated BIP-8 value 1201, which is '11110000', is stored and used in the network of the network provider C 1200. Meanwhile, since a receiver of a provider equipment 1350 of the network provider C 1200 has an incoming error bit of '1', it is possible to know that the error has occurred in the preceding network and, at the same time, since the calculated BIP-8 value is the same as a value stored in the transmitted TCM packet, the network provider C 1200 can know that the error has not occurred in its network.

As described above, the TCM method of the present invention can easily detect the location of a network where performance degradation is originated by informing the cause of the performance degradation to the network provider of the network or an adjacent network provider in an MPLS network, when a performance error has occurred in a specific network provider. Also, the TCM method can provide charging criteria and make sure which part is responsible based on a Service Level Agreement (SLA) agreed between users and a service provider and between a service provider and a network provider.

While the present invention has been shown and described in connection with the exemplary embodiments, it will be apparent to those skilled in the art that modifications and variations can be made without departing from the spirit and scope of the invention as defined by the appended claims.

What is claimed is:

1. A method for performing Tandem Connection Monitoring (TCM) by a provider equipment or a customer equipment using a Multi-Protocol Label Switching (MPLS) Operation and Maintenance (OAM) packet in an MPLS network, the method comprising:
   calculating, by the provider equipment or the customer equipment, a Byte Interleaved Parity 16 (BIP-16) parity of a received TCM packet;
   determining whether there is an error by comparing the calculated BIP-16 parity with a BIP-16 parity stored in the received TCM packet;
   setting a value of '0' or '1' in an incoming error field allocated to a service provider level based on a determination result on the presence of an error;
   calculating a Byte Interleaved Parity 8 (BIP-8) parity of the received TCM packet and storing the calculated BIP-8 parity in a service provider TCM BIP-8 field of the received TCM packet; and
   when the calculated BIP-8 parity is stored in a service provider TCM BIP-8 field of the received TCM packet, the TCM parity is transmitted from the service provider level.

2. The method of claim 1, wherein the received TCM packet comprises:
   a function type field for defining a TCM function; and a TCM field comprising one byte for checking the BIP-8 parity of the service provider level, one byte for checking the BIP-8 parity of the network provider level, and one byte for indicating whether there is an incoming error at the service provider level and at the network provider level detected by the checking of the BIP-8 parities.

3. The method of claim 1, wherein the calculating a BIP-16 parity of a received TCM packet is executed based on an equation expressed as:

$$\text{BIP-16} = \text{Function type}(08\text{Hex}) \oplus \text{LSP TTSI} \oplus \text{padding}.$$

4. The method of claim 1, wherein in the determining of whether there is an error, an error is regarded to have occurred when the calculated BIP-16 parity is different from the BIP-16 parity stored in the received TCM packet.

5. The method of claim 1, wherein in the setting up of a value of '0' or '1' in an incoming error field allocated to a service provider level based on a determination result on the presence of an error, a '1' value is stored in the incoming error field allocated to the service provider, when an error has occurred.

6. The method of claim 1, wherein in the setting up of a value of '0' or '1' in an incoming error area allocated to a service provider level based on a determination result on the presence of an error, a '0' value is stored in the incoming error field allocated to the service provider, when no error has occurred.

7. The method of claim 1, wherein in the calculating of a BIP-8 parity of the received TCM packet and storing of the calculated BIP-8 parity in a service provider TCM BIP-8 field of the received TCM packet, the BIP-8 parity of the received TCM packet is acquired based on an equation expressed as:

BIP-8=Function type(08Hex)⊕L5P TTSI⊕padding BIP-16.

8. A method for performing Tandem Connection Monitoring (TCM) by a provider equipment using a Multi-Protocol Label Switching (MPLS) Operation and Maintenance (OAM) packet in an MPLS network, the method comprising:

determining whether there is an error by checking an incoming error field allocated to a service provider in a received TCM packet;

calculating, by the provider equipment, a Byte Interleaved Parity 8 (BIP-8) value of the received TCM packet and determining whether there is an error by comparing the calculated BIP-8 value with a value stored in a service provider TCM BIP-8 of the received TCM packet; and storing a predetermined value in the incoming error field of the service provider based on a determination result on the presence of an error, wherein the predetermined value indicates whether an error has occurred during TCM packet transmission.

9. The method of claim 8, wherein in the determining of whether there is an error by checking an incoming error field allocated to a service provider in a received TCM packet, when a '1' value is stored in the incoming error bit allocated to the service provider, a result is made that an error has occurred before a current service provider.

10. The method of claim 8, wherein in the determining of whether there is an error by checking an incoming error field allocated to a service provider in a received TCM packet, when a '0' value is stored in the incoming error bit allocated to the service provider, a result is made that no error has occurred before a current service provider.

11. The method of claim 8, wherein in the calculating of a BIP-8 value of the received TCM packet and determining of whether there is an error by comparing the calculated BIP-8 value with a value stored in a service provider TCM BIP-8 of the received TCM packet, the BIP-8 value is acquired based on an equation expressed as:

BIP-8=Function type(08Hex)⊕LSP TTSI⊕padding⊕BIP-16.

12. The method of claim 11, wherein in the calculating of a BIP-8 value of the received TCM packet and determining of whether there is an error by comparing the calculated BIP-8 value with a value stored in a service provider TCM BIP-8 of the received TCM packet, when the calculated BIP-8 value of the received TCM packet is different from a value stored in a service provider TCM BIP-8 field of the received packet, a result is made that an error has occurred in a network of the current service provider.

13. The method of claim 12, wherein in the determining of a predetermined value in an incoming error field of the service provider based on a determination result on the presence of an error, when the result is made that an error has occurred in the network of the current service provider, a '1' value is stored in the incoming error field.

14. A method for performing Tandem Connection Monitoring (TCM) by a provider equipment using a Multi-Protocol Label Switching (MPLS) Operation and Maintenance (OAM) packet in an MPLS network, the method comprising:

calculating, by the provider equipment, a Byte Interleaved Parity 8 (BIP-8) value of a received TCM packet;

determining whether an error has occurred in a network of a network provider by comparing the calculated BIP-8 value with a value stored in a network provider TCM BIP-8 of the received TCM packet;

storing a predetermined value in an incoming error field allocated to a network provider of the received TCM packet according to the decision result on whether there is an error;

when an error has occurred in the network of the current network provider, changing the value of the network provider TCM BIP-8 of the TCM packet into the calculated BIP-8 value; and transmitting the TCM packet including the changed value of the network provider TCM BIP-8.

15. The method of claim 14, wherein in the storing of a predetermined value in an incoming error field allocated to a network provider of the received TCM packet according to the decision result on whether there is an error, a '1' value is stored in an incoming error field allocated to a network provider of the received TCM packet, when an error has occurred, and a '0' value is stored in the incoming error field allocated to a network provider of the received TCM packet, when no error has occurred.

16. A method for performing Tandem Connection Monitoring (TCM) by a provider equipment using a Multi-Protocol Label Switching (MPLS) Operation and Maintenance (OAM) packet in an MPLS network, the method comprising:

determining whether there is an error by checking an incoming error field allocated to a network provider in a received TCM packet;

calculating, by the provider equipment, a Byte Interleaved Parity 8 (BIP-8) value of the received TCM packet;

determining whether there is an error by comparing the calculated BIP-8 value with a value stored in a network provider TCM BIP-8 of the received TCM packet; and storing a predetermined value in the network provider TCM BIP-8 of the received TCM packet based on a result of the comparing, wherein the predetermined value indicates whether an error has occurred during TCM packet transmission.

* * * * *